(No Model.) 2 Sheets—Sheet 1.
H. S. GOUGHNOUR.
BRAKE MECHANISM.
No. 591,836. Patented Oct. 19, 1897.
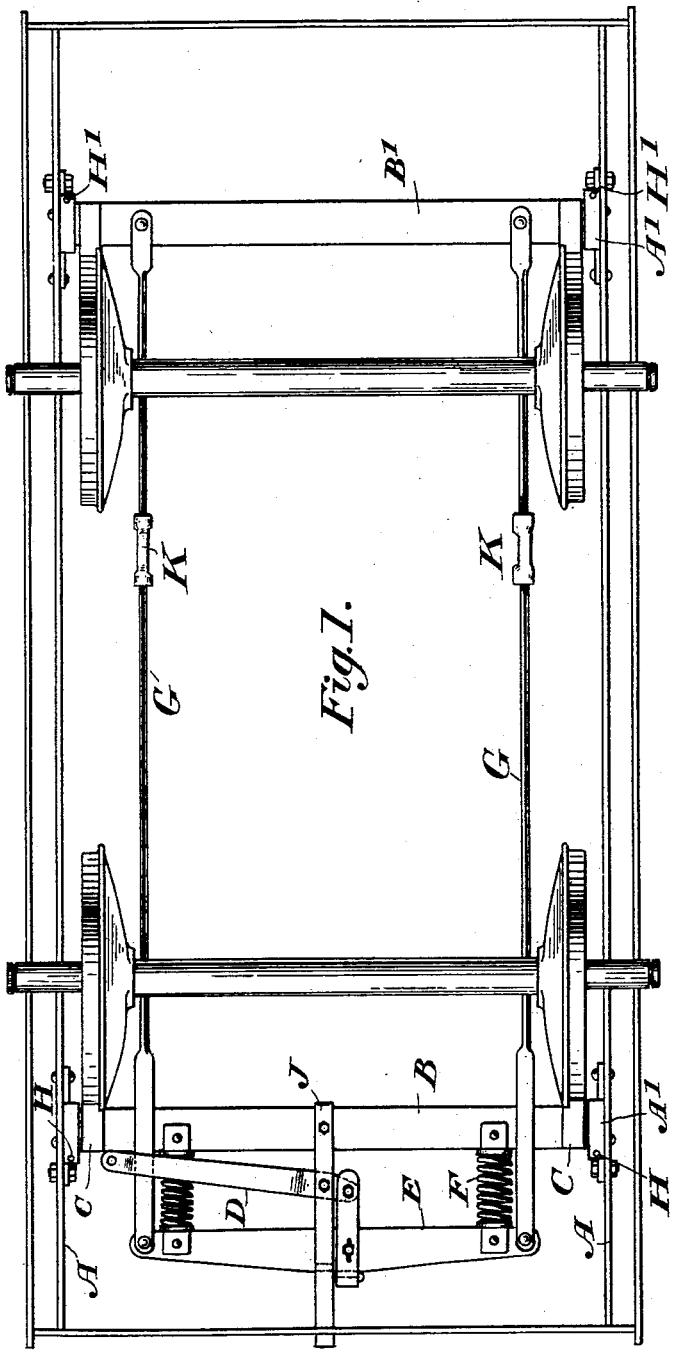
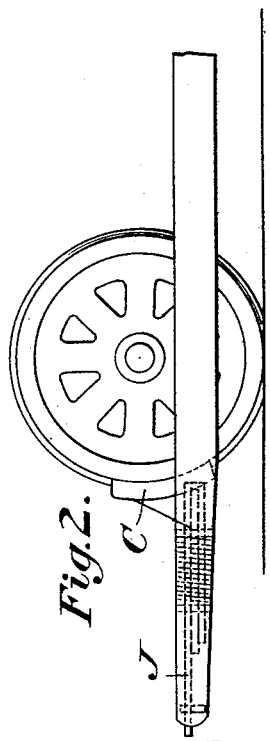
WITNESSES:
INVENTOR
H. S. Goughnour
BY Richard Eyre
ATTORNEY.

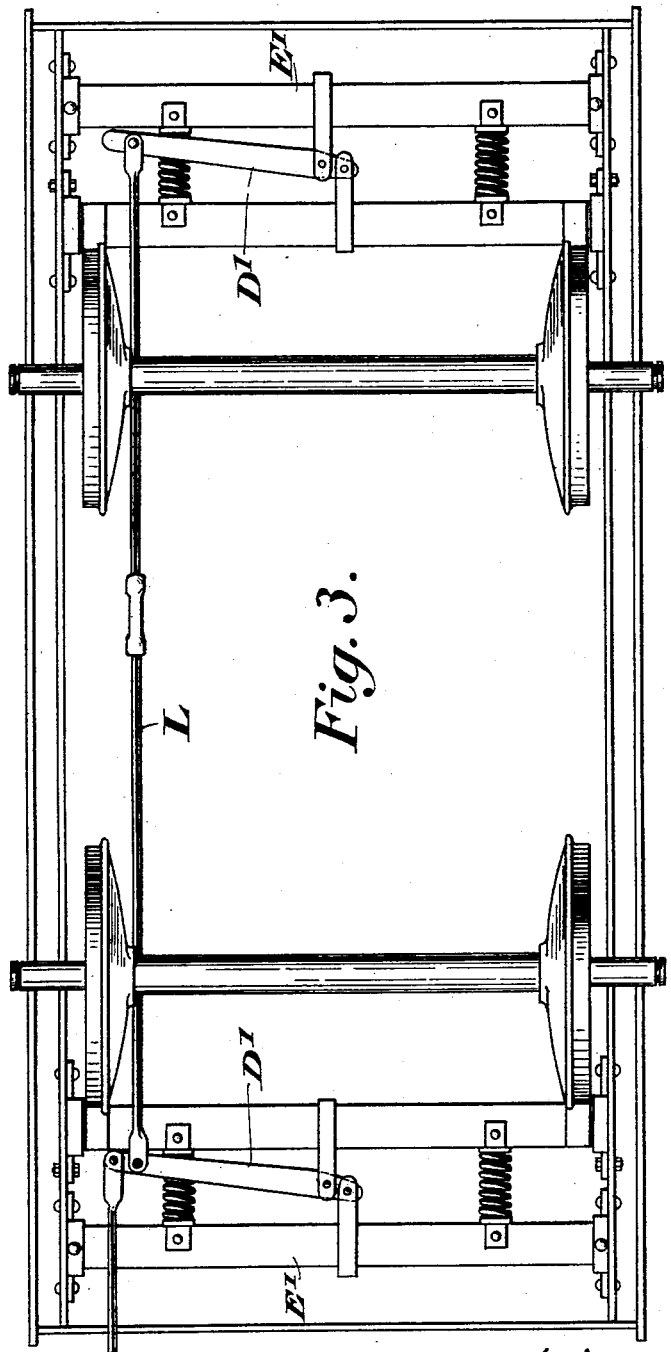

UNITED STATES PATENT OFFICE.

HENRY S. GOUGHNOUR, OF JOHNSTOWN, PENNSYLVANIA, ASSIGNOR TO THE JOHNSON COMPANY, OF LORAIN, OHIO.

BRAKE MECHANISM.

SPECIFICATION forming part of Letters Patent No. 591,836, dated October 19, 1897.

Application filed May 21, 1897. Serial No. 637,491. (No model.)

*To all whom it may concern:*

Be it known that I, HENRY S. GOUGHNOUR, of Johnstown, Cambria county, Pennsylvania, have invented certain new and useful Improvements in Brake Mechanism, of which the following is a specification.

The object of my invention is to provide an improved brake mechanism for the trucks of vehicles which will be automatic in action, so that the operator instead of drawing the brake-shoe into its operative position by a suitable mechanism will draw the brake-shoe away from the wheel by the said mechanism, the tendency at all times being to press the shoe against the wheels by means of suitable springs or other equivalent devices. By providing a device of this character an accident to the chain or other parts of the mechanism will at once press the brake-shoes against the wheels and stop the vehicle. Ordinarily such an accident renders the operator powerless to stop the vehicle, and is, therefore, a source of constant danger.

A further advantage of my invention is that in case of emergency the brakes are set instantly by merely releasing the brake-lever, whereas with the brake generally used sufficient time must be taken by the operator to take up the slack chain and then draw the shoe forward by muscular exertion.

My invention consists, therefore, in the provision of means for the accomplishment of the purposes already stated, and in the improved construction, arrangement, and combination of parts to be hereinafter described.

Referring to the drawings, Figure 1 is a plan view of a truck having my improved brake mechanism. Fig. 2 is a side view of a part of the same. Fig. 3 is a plan of a truck, showing a modification of the brake mechanism shown in Fig. 1.

Upon the side-bars A of the truck slides the brake-beam B.

A' are guides within which the brake-beam slides.

C represents the brake-shoes.

The chain-rod is secured to the end of the lever B, which is pivoted to an extension of the counter-lever E. Between B and E are powerful compression-springs F, which tend to separate B and E. The beam E is secured by brake-rods G to the brake-beam B' at the other end of the vehicle, so that when the lever D is drawn against the action of the springs both brake-beams are drawn back from the wheels against the action of the springs F. I prefer to provide stop-pins H and H' to prevent undue movement of one of these brake-beams at the expense of the other.

J is a longitudinal guide secured to B and hooking about both B and E, so as to guide the movement of E in a constant horizontal plane. The guide J is shown clearly in dotted lines in Fig. 2.

The turnbuckles K on the brake-rods G may be used to adjust the strength of the springs as desired.

In Fig. 3 I show a modification of my device whereby I dispense with the brake-rods G and substitute the chain rod L, providing two levers D' D', instead of the one lever D as before. With this arrangement both brakes must work simultaneously.

Instead of the beam E, (shown in Fig. 1,) I provide beams E' E', which are rigidly secured to the side bars of the truck and the guide J is dispensed with.

I do not desire to limit myself to the exact details which I have shown and described, for modifications in such details may readily suggest themselves to those skilled in the art.

It is also clear that my invention is not limited in its scope to wheel-brakes, for any one skilled in the art could readily modify the details so as to adapt it to other characters of brakes, such as track-brakes.

I have shown my invention as applied to a truck having an operating-lever at but one end of the truck, as I have considered that those modifications in the mechanism necessary to adapt my invention to double-ended trucks are so well known as to need no description.

Having thus described my invention, what I claim, and desire to protect by Letters Patent, is—

1. In a car-truck, a brake mechanism comprising the combination of a transverse brake-beam at each end of the truck, a counter-lever, compression-springs between, and tending to separate, the counter-lever and contiguous brake-beam, a hand-operated lever pivotally connected to both the contiguous counter-lever and brake-beam, and connections from the mechanism at one end of the truck to that at the other end thereof for operating the brake-beams in unison whether in a forward or a reverse direction.

2. The combination with a truck of a rigid counter-lever at each end thereof, a movable brake-beam contiguous to each counter-lever, compression-springs between each counter-lever and its contiguous brake-beam tending to separate the same, two levers for opposing the action of said springs each of which is pivoted to both a brake-beam and counter-lever, and a connecting-rod securing together said levers.

In testimony whereof I have affixed my signature in presence of two witnesses.

HENRY S. GOUGHNOUR.

Witnesses:
MYRTLE E. SHARPE,
H. W. SMITH.